United States Patent [19]

Trocciola et al.

[11] Patent Number: 4,695,518
[45] Date of Patent: Sep. 22, 1987

[54] SILICON CARBIDE MATRIX FOR FUEL CELLS

[75] Inventors: John C. Trocciola, Glastonbury; Joseph Powers, Riverside, both of Conn.; Ronald G. Martin, Monson, Mass.

[73] Assignee: United Technologies Corporation, Hartford, Conn.

[21] Appl. No.: 722,176

[22] Filed: Apr. 10, 1985

Related U.S. Application Data

[63] Continuation of Ser. No. 516,152, Jul. 21, 1983, abandoned.

[51] Int. Cl.⁴ .............................................. H01M 8/14
[52] U.S. Cl. ........................................ 429/12; 429/44; 429/41
[58] Field of Search ............................. 429/41, 44, 12

[56] References Cited

U.S. PATENT DOCUMENTS

| | | | |
|---|---|---|---|
| 4,007,058 | 2/1977 | Nelson et al. | 429/41 |
| 4,017,664 | 4/1977 | Breault | 429/44 |
| 4,035,551 | 7/1977 | Grevstad | 429/44 |

Primary Examiner—Donald L. Walton
Attorney, Agent, or Firm—Stephen E. Revis

[57] ABSTRACT

A matrix for holding the electrolyte within a phosphoric acid fuel cell is made from silicon carbide and a binder of polyestersulfone. Preferably the matrix consists of 10–20 weight percent polyethersulfone with a balance of silicon carbide. The matrix has improved strength, wettability and bubble pressure compared to the best known prior art matrix.

8 Claims, 2 Drawing Figures

SILICON CARBIDE MATRIX FOR FUEL CELLS

CROSS-REFERENCE TO RELATED APPLICATIONS

This is a continuation of prior application Ser. No. 516,152 filed July 21, 1983 which is now abandoned.

DESCRIPTION

1. Technical Field

This invention relates to a matrix for retaining electrolyte in a phosphoric acid fuel cell.

2. Background Art

One type of fuel cell which is known in the art is a fuel cell using liquid phosphoric acid as the electrolyte. The electrolyte is retained in a matrix disposed between a pair of gas diffusion electrodes. Typically, a hydrogen containing gas is used as the fuel and an oxygen containing gas, such as air, is used as the oxidant. The electrodes may include a layer of platinum or platinum alloy catalyst disposed on the surface thereof adjacent to the matrix.

In order for the electrolyte retaining matrix to perform satisfactorily in this type of cell it must have the following properties: (1) it must be porous and have good liquid permeability; (2) it must be wettable to the electrolyte and provide good ionic conductivity; (3) it must be an electronic insulator; (4) it must be chemically stable in the phosphoric acid electrolyte at fuel cell operating temperatures and an electrode open circuit potentials such that even after many thousands of hours (preferably at least 40,000 hours) of operation there is no significant generation of by product materials that will poison the catalyst; (5) it must provide a bubble pressure sufficient to prevent reactant gas crossover through the matrix; and (6) it must have structural integrity throughout its required life; and (7) it should be as thin as possible yet still provide all of the foregoing properties.

The best matrix material of the prior art for use in phosphoric acid fuel cells is silicon carbide. A silicon carbide matrix for fuel cells is described in commonly owned U.S. Pat. No. 4,017,664, which is incorporated herein by reference. As set forth therein, fuel cells have been constructed and operated using a 100 percent silicon carbide matrix. However, the SiC tends to shift around within the cell so that a uniform layer is difficult to maintain, thereby causing a reduction in cell performance. It has, therefore, been necessary to mix the silicon carbide with a binder which is compatible with phosphoric acid. The binder disclosed in the '664 patent is a fluorocarbon polymer such as polytetrafluoroethylene (PTFE) or fluorinated ethylene propylene (FEP). It is taught that only the minimum amount of binder should be used because both PTFE and FEP are hydrophobic, and increased quantities increase the hydrophobicity of the matrix, which is undesirable. Thus, the '664 patent specifies that the matrix should comprise no more than ten percent binder, and preferably only between two and five percent binder, the balance being silicon carbide.

The binder, of course, provides structural integrity to the matrix. Therefore, in the prior art, matrix strength had to be sacrificed to assure adequate wettability of the silicon carbide. Up to the present time it has not been known how to improve matrix properties, such as structural integrity, wettability, and bubble pressure without sacrificing one or more desirable properties in the process.

Other patents of interest as regards electrolyte retaining matrices for fuel cells are: U.S. Pat. No. 3,861,963 (a coated or impregnated polysulfone separator for base electrolyte fuel cells); U.S. Pat. No. 3,379,573 (treated PTFE as a matrix in base electrolyte fuel cells); and U.S. Pat. No. 3,651,030 (polysulfones treated to make them wettable for use as a matrix in alkaline electrolyte fuel cells.

DISCLOSURE OF INVENTION

A principal object of the presenst invention is an improved electrolyte retaining matrix for a phosphoric acid fuel cell.

A more specific object of the present invention is a matrix for a phosphoric acid fuel cell, the matrix having improved strength and good wettability and bubble pressure characteristics.

According to the present invention, a matrix for a phosphoric acid fuel cell consists essentially of silicon carbide with polyethersulfone (PES) as a binder.

Polyethersulfone, as that term is used herein and in the claims, is an organic polymer comprising at least two-thirds, by molecular weight, the following repeating unit:

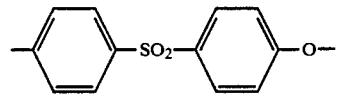

The SO$_2$ linkage is known as a sulfone group, and the oxygen linkage is an ether group. Both the sulfone and ether groups have been discovered to be significantly more corrosion resistant to phosphoric acid as compared, for example, to sulfur groups linked directly to aryl groups

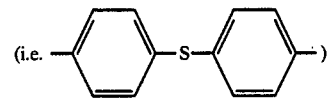

or aryl groups linked directly to other aryl groups

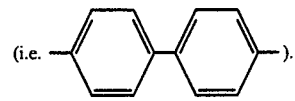

While the definition of polyethersulfone set forth herein does not exclude, for example, such sulfur and aryl groups, it does limit them to amounts which could be acceptable for some applications (perhaps lower temperature and shorter term applications). Most preferably, the polyethersulfone consists essentially only of the ethersulfone repeating unit identified above.

In contradistinction to the fluorocarbon ploymer binders suggested by the prior art (e.g. polytetrafluroethylene and fluorinated ethylene propylene), PES is hydrophilic (i.e. wettable by liquid water). In view of this fact, coupled with the stability of PES in phosphoric acid at temperatures up to at least 375 degrees F., it has been found that PES can be used in proportionately larger amounts as a binder for a silicon carbide matrix without impairing the wettability characteristics of the matrix while significantly improving its strength and bubble pressure.

The foregoing and other objects, features and advantages of the present invention will become more apparent in the light of the following detailed description of preferred embodiments thereof as shown in the accompanying drawing.

BEST MODE FOR CARRYING OUT THE INVENTION

Figure 1:
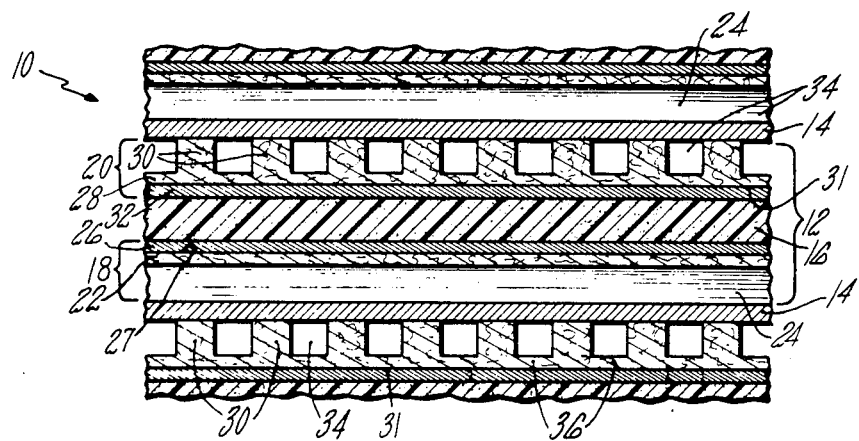
FIG. 1 is a cross-sectional view of part of a fuel cell stack showing several adjacent fuel cells each incorporating a matrix in accordance with the teachings of the present invention.

The fuel cell stack is generally designated by the numeral 10. Each stack 10 is comprised of a plurality of fuel cells 12 separated by gas separtor plates 14. Each cell 12 includes an electrolyte retaining matrix layer 16 having an anode electrode 18 disposed on one side thereof and a cathode electrode 20 disposed on the other side thereof. The electrodes are gas diffusion electrodes which are well known in the fuel cell art. The present invention is not intended to be limited to any particular composition or construction of such electrodes.

The anode electrode 18 comprises a substrate 22 having ribs 24 extending thereacross (parallel to the plane of the paper as shown in the drawing) and a catalyst layer 26 disposed on the flat, nonribbed side 27 thereof. The cathode electrode 20 includes a substrate 28 having ribs 30 extending thereacross on one side thereof (perpendicular to the plane of the paper) and a catalyst layer 32 disposed on the non-ribbed side 31 thereof. The ribs 24, 30 of the anode and cathode electrode substrates abut the separator plates 14 and form reactant gas channels 34 on each side of the separator plates 14. The matrix layer 16 has phosphoric acid electrolyte disposed therein.

In accordance with the present invention, the matrix layer 16 is a combination of silicon carbide and polyethersulfone. The silicon carbide may be in the form of either particles or fibers with particles being preferred due to their lower cost. The PES preferably has a number average molecular weight of at least 17,000, with a number average molecular weight of at leat 25,000 being most preferred for corrosion resistance and better strength at the higher temperature. The PES binds the silicon carbide particles together and provides the structural integrity for the matrix. The greater the proportion of PES, the stronger the matrix. The matrix characteristic which limits the amount of PES which may be used is porosity. Since porosity of the matrix is directly related to the amount of electrolyte which it can store, high porosity is desirable. To enable the fabrication of matrices which are very thin and also have adequate electrolyte storage capability, it is preferred that the porosity of the matrix be no less than about 38 percent. This corresponds to a matrix containing about 30 weight percent PES and 70 weight percent silicon carbide. The silicon carbide/PTFE matrix of the prior art preferably contains no more than about five percent (by weight) PTFE in order to have good wettability properties; yet, at those low amounts, the matrix is not as strong as desirable. Since PES is hydrophilic, acceptable wettability characteristics of the matrix can be obtained despite using a much higher proportion of PES to silicon carbide. Alternatively, the same proportion of PES to silicon carbide as PTFE to silicon carbide could be used, and the matrix would have improved wettability and therefore (probably) also improve bubble pressure. It is believed strength would also be improved since, weight for weight, PES is a better binder than fluorocarbon polymers. Silicon carbide/PTFE matrices of the prior art containing about 4 weight percent PTFE have a porosity of about 52 percent. The same porosity can be obtained in a matrix of the present invention comprising about 20 percent PES and 80 weight percent silicon carbide. A matrix having about 10 percent PES and 90 percent silicon carbide would have a porosity of almost 60 percent. Thus, large amounts of PES may be used the matrices of the present invention to obtain good strength, without sacrificing porosity or wettability. However, because silicon carbide has better corrosion resistance to phosphoric acid than does PES, (or any other known binder, for that matter), the addition of PES adversely affects long term matrix stability. For this reason it is preferred, although not required, to limit the amount of PES to 20 weight percent.

Another advantageous property of PES is that, in contrast to PTFE, it is dissolvable in many types of solvents, such as methylene chloride. When PES is dissolved in a solvent and mixed with silicon carbide particles, it coats the particles and is uniformly dispersed throughout the matrix. This uniform dispersion of PES and the fact that PES is wettable results in the phosphoric acid electrolyte becoming more uniformly distributed throughout the matrix, and more acid can thereby be held by the matrix. This also contributes to improved bubble pressure. Test were conducted on five 7 mil thick matrices consisting of silicon carbide with 10 weight percent PES, (the PES consisted entirely of ethersulfone linkages

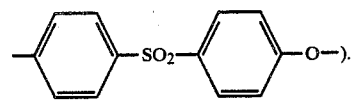

The average bubble pressure for those five test was 25.7 psi. For purposes of comparison, a 7 mil thick prior art matrix consisting of silicon carbide with three weight percent PTFE was tested and had a bubble pressure of only 16.5 psi.

Figure 2:
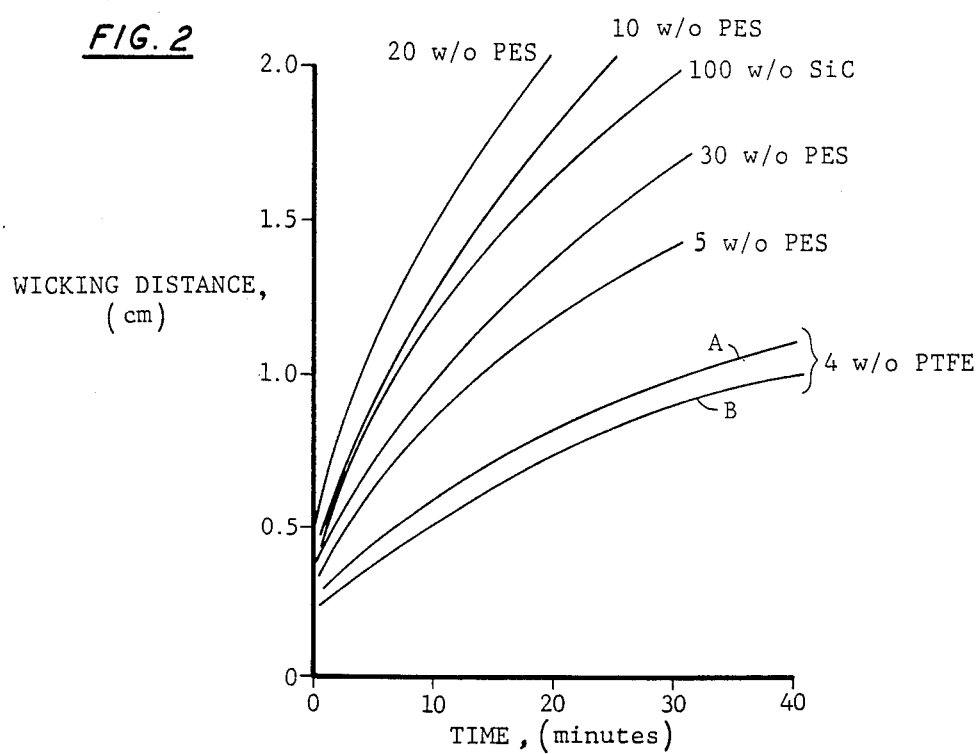
FIG. 2 is a graph comparing acid wicking capabilities of the matrices of the present invention with those of the prior art.

The nonwettability of PTFE makes the silicon carbide/PTFE matrix considerably more difficult to fill or refill with electrolyte. The improvement provided by the present invention is demonstrated by the test results displayed in FIG. 2. The testing represented by FIG. 2 involved filling a glass tube with the matrix material to be tested and immersing one end of the vertically held tube in 96 percent $H_3PO_4$. The wicking distance was then measured over time. The matrix material in each case was silicon carbide plus the binder indicated on the curve in terms of its weight percent. The PES used consisted entirely of ethersulfone repeating units. The PES/SiC matrices were all heat treated at 550° F. for 20 minutes. The PTFE/SiC matrices were heat treated at 600° F. (curve A) and 570° F. (curve B).

Referring to the graph, although silicon carbide itself (i.e. 100 percent silicon carbide) has good wicking or filling characteristics, such characteristics were improved by the addition of 10 and 20 weight percent PES. Even though the addition of 5 and 30 weight percent PES resulted in reduced wicking capability as compared to 100 percent silicon carbide, silicon carbide with as little as 4 weight percent PTFE had significantly poorer wicking capabilities than any of the silicon carbide/PES samples tested, and it is known that PTFE in amounts greater than 4 percent will have even poorer wicking properties.

Based upon consideration of all the various desirable properties of matrices for phosphoric acid fuel cells and how different proportions of PES to SiC affect such properties, it has been determined that matrices consisting of silicon carbide and at least 10 percent PES being most preferred, with 10 to 20 weight percent PES being most preferred.

The following example describes how to make a matrix layer comprising 90 percent silicon carbide and 10 percent polyethersulfone. The silicon carbide of this example is a powder which may be purchased from the Carburundum Company under the designation Green 1000 Grit. The polyethersulfone resin is a powder purchased from ICI Americas Inc. (the U.S. operating company of Imperial Chemical Industries Limited) and is their 600P grade PES having a designation of KM-1 and consisting entirely of ethersulfone repeating units. It has a number average molecular weight of between 25,000 and 27,000. In the example the matrix material was formed into an "ink" suitable for curtain coating in accordance with the teachings of commonly owned U.S. Pat. No. 4,173,662 which is incorporated herein by reference.

EXAMPLE

Immediately before using the PES, it was dried in a 300° F. oven for about two hours to assure that it was moisture free. 100 grams of the dried PES resin was dissolved in 400 grams of methylene chloride ($CH_2Cl_2$). In a separate container, 900 grams of the silicon carbide was mixed 500 grams of methylene chloride. The PES/methylene chloride mixture was then added to the silicon carbide/methylene chloride mixture. The combination was stirred until well mixed. This mixture was poured onto a polytetrafluorethylene sheet and was spread to from a thin layer which was allowed to dry overnight at room temperature to remove most of the methylene chloride. This layer was broken up into flakes and chopped in a blender into fine powder. 960 grams of this fine powder was blended with 625 grams of distilled water and 175 grams of a 2 percent polyethylene oxide solution having a viscosity of about 640 centipoise. The blended mixture was covered and allowed to sit overnight. 2.7 grams of Triton X-100, a surfactant sold by the DuPont Company, was added to this mixture and mixed well for 45 minutes. The resulting mixture, having a Brookfield viscosity of about 550 centipoise, is now ready to be applied by curtain coating (or other means) onto, for example, the platinum catalyzed surface of gas diffusion electrodes in accordance with aforementioned U.S. Pat. No. 4,173,662. The coated electrode would then be dried at room temperature and then heat treated to remove water, polyethylene oxide, residual methylene chloride, and Triton X-100 surfactant and to sinter (i.e. partially melt) the PES binder. A typical heat treatment is 550° F. for 20 minutes.

A two inch by two inch test cell incorporating a 6 to 7 mil thick 90 percent silicon carbide/10 percent PES matrix made essentially in accordance with the method of the above example (except the ink was applied to the electrodes by dipping rather than curtain coating) was run for 17,000 hours at 375° F. with no sign of performance decay any worse than silicon carbide/PTFE matrices of the prior art. After 16,000 hours there was no sign of catalyst poisioning, as evidenced by the lack of any significant change in cathode cayalyst specific activity, for oxygen reduction, at between 0.8 and 0.9 volt. Additionally, there was no indication of any anode poisons as measured by the hydrogen gain and limiting currents. The test was terminated at 17,000 hours to determine post test properties. Post test examination indicated that the matrix remained physically intact for the duration of the test.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A fuel cell comprising:
   a pair of spaced apart gas diffusion electrodes;
   a porous electrolyte retaining matrix confined in the space between said electrodes, said matrix having a porosity of at least 38 percent and consisting essentially of 70 to 90 weight percent silicon carbide and a balance of hydrophilic polyethersulfone as a binder; and
   phosphoric acid electolyte disposesd within said matrix, wherein said matrix has the characteristic that it remains physically intact for at least 17,000 hours of fuel cell operation at 375° F.

2. The fuel cell according to claim 1 wherein said matrix includes between 10 and 20 weight percent polyethersulfone.

3. The fuel cell according to claim 1 wherein said polyethersulfone consists essentially of the repeating unit

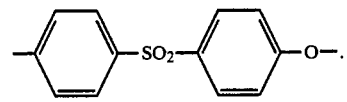

4. The fuel cell according to claim 3 wherein said polyethersulfone has a number average molecular weight of at least 17,000.

5. The fuel cell according to claim 3 wherein said polyethersulfone has a number average molecular weight of at least 25,000.

6. A fuel cell comprising;
   a pair of spaced apart gas diffusion electrodes;
   a porous electrolyte retaining matrix confined in the space between said electrodes, said matrix consisting essentially of silicon carbide particles with a balance of between 10 and 20 weight percent hydrophilic polyethersulfone, said polyethersulfone consisting essentially of the repeating unit

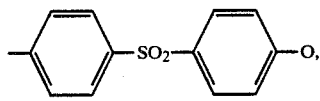

said matrix having a porosity of least 38 percent; and phosphoric acid electrolyte disposed within said matrix, wherein said matrix has the characteristic that it remains physically intact for at least 17,000 hours of fuel cell operation at 375° F.

7. An electrolyte retaining matrix for a fuel cell, said matrix having a porosity of at least 38 percent and consisting of 80 to 90 weight percent silicon carbide particles and a balance of polyethersulfone, said polyethersulfone coating said silicon carbide particles and being uniformly dispersed throughout said matrix, said polyethersulfone having a number average molecular weight of at least 25,000.

8. The matrix according to claim 7 wherein said polyethersulfone consists essentially of the repeating unit:

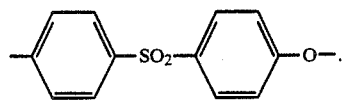

* * * * *